(12) United States Patent
Sato et al.

(10) Patent No.: US 11,662,293 B2
(45) Date of Patent: May 30, 2023

(54) INSPECTION METHOD FOR PILLAR-SHAPED HONEYCOMB FILTER

(71) Applicant: NGK INSULATORS, LTD., Nagoya (JP)

(72) Inventors: Yoshihiro Sato, Nissin (JP); Takakazu Koyama, Gifu (JP); Yuji Watanabe, Kasugai (JP); Yutaka Ishii, Ama-Gun Oharuchou (JP); Takaaki Kanemitsu, Nagoya (JP); Makoto Murai, Nagoya (JP); Masanari Iwade, Nagoya (JP); Takafumi Terahai, Nagoya (JP); Ryota Kurahashi, Nagoya (JP); Akinari Fukaya, Nagoya (JP); Kenji Ebisutani, Nagakute (JP)

(73) Assignee: NGK INSULATORS, LTD., Nagoya (JP)

( * ) Notice: Subject to any disclaimer, the term of this patent is extended or adjusted under 35 U.S.C. 154(b) by 203 days.

(21) Appl. No.: 17/184,936

(22) Filed: Feb. 25, 2021

(65) Prior Publication Data

US 2021/0302296 A1    Sep. 30, 2021

(30) Foreign Application Priority Data

Mar. 31, 2020   (JP) .............................. JP2020-064973

(51) Int. Cl.
*G01N 15/06* (2006.01)
*G01N 15/08* (2006.01)
*G01N 21/95* (2006.01)

(52) U.S. Cl.
CPC ........... *G01N 15/06* (2013.01); *G01N 15/082* (2013.01); *G01N 21/95* (2013.01); *G01N 2015/0693* (2013.01); *G01N 2015/084* (2013.01)

(58) Field of Classification Search
CPC ........ G01N 15/00; G01N 15/06; G01N 15/08; G01N 15/082; G01N 21/17; G01N 21/47;
(Continued)

(56) References Cited

U.S. PATENT DOCUMENTS 7,674,309 B2 *  3/2010  Gargano ................ G01N 21/53
                                                                356/402
8,234,909 B2 *  8/2012  Suman .................... G01M 3/38
                                                                96/417

(Continued)

FOREIGN PATENT DOCUMENTS

JP    2009-092480 A1    4/2009
JP    2009-258090 A1    11/2009
(Continued)

*Primary Examiner* — Nguyen Q. Ha
(74) *Attorney, Agent, or Firm* — Burr Patent Law, PLLC (57) ABSTRACT

An inspection method for a pillar-shaped honeycomb filter having a honeycomb-shaped first end face and a honeycomb-shaped second end face, including:
  allowing gas containing fine particles to flow into the first end face;
  imaging the entire second end face covered with the sheet-like light using a camera while the gas that has flowed into the first end face flows out of the second end face through the filter, and generating an image of the entire second end face covered with the sheet-like light;
  selecting an inspection area of the second end face and measuring information concerning a sum of luminance of all pixels in the inspection area; and
  determining quality of the filter based on at least the information concerning the concentration of the fine particles in the gas before the gas flows into the first end face and the information concerning the sum of luminance.

9 Claims, 6 Drawing Sheets

(58) Field of Classification Search
CPC ........... G01N 21/95; G01N 2015/0693; G01N 2015/084
See application file for complete search history.

(56) References Cited

U.S. PATENT DOCUMENTS

| | | | |
|---|---|---|---|
| 9,038,439 B2 * | 5/2015 | Citriniti | G01N 15/08 73/38 |
| 2008/0173071 A1 * | 7/2008 | Park | G01N 21/95692 73/38 |
| 2009/0051909 A1 * | 2/2009 | Kato | G01N 15/08 356/237.6 |
| 2009/0237652 A1 | 9/2009 | Akao et al. | |
| 2010/0201983 A1 | 8/2010 | Hatano et al. | |
| 2016/0097705 A1 * | 4/2016 | Woolard | G01M 3/205 73/38 |

FOREIGN PATENT DOCUMENTS

| | | | |
|---|---|---|---|
| JP | 2012-063349 A1 | 3/2012 | |
| JP | 2013-234952 A1 | 11/2013 | |
| WO | 2009/028709 A1 | 3/2009 | |
| WO | WO-2013008848 A1 * | 1/2013 | ............. F01N 11/00 |
| WO | 2017/061383 A1 | 4/2017 | |

* cited by examiner

INSPECTION METHOD FOR PILLAR-SHAPED HONEYCOMB FILTER

FIELD OF THE INVENTION

The present invention relates to an inspection method for a pillar-shaped honeycomb filter.

BACKGROUND OF THE INVENTION

Particulate matters (hereinafter referred to as PMs) such as soot are contained in an exhaust gas discharged from an internal combustion engine such as diesel engines and gasoline engines. The soot is harmful to the human body and its emission is regulated. Currently, in order to comply with exhaust gas regulations, filters represented by DPFs and GPFs for passing an exhaust gas through small porous partition walls to filtrate PMs such as soot, are widely used.

Known as a filter for collecting the PMs is a wall flow type pillar-shaped honeycomb structure (hereinafter, also referred to as a "pillar-shaped honeycomb filter") including: a plurality of first cells extending from a first end face to a second end face in a height direction, the first end face being opened and the second end face having plugged portions; and a plurality of second cells arranged to be adjacent to the first cells across partition walls and extending from the first end face to the second end face in the height direction, the first end face having plugged portions and the second end face being opened.

In recent years, with tightening of exhaust gas regulations, stricter PM emission standards (PN regulation: Particle Matter Number Regulation) have been introduced, and high PM collection performance (PN high collection efficiency) is required for filters. Therefore, it is desirable to inspect a PN collection efficiency before the filter is shipped to prevent the filter that does not meet the required specifications from being distributed in the market. However, it is not necessarily realistic that an actual exhaust gas is passed through a filter to inspect the quality in terms of time and cost. Therefore, alternative simple inspection methods have been developed.

A typical method of conventional simple inspection method is to detect a defective portion by feeding a gas flow containing fine particles to an inlet end face of a pillar-shaped honeycomb filter, observing an outlet end face of the pillar-shaped honeycomb filter while irradiating the gas flow exiting the outlet end face with light, and visualizing the fine particles leaking from the outlet end face (Patent Literatures 1 to 6).

CITATION LIST

Patent Literatures

[Patent Literature 1] WO 2017/061383 A1
[Patent Literature 2] Japanese Patent Application Publication No. 2013-234952 A
[Patent Literature 3] Japanese Patent Application Publication No. 2012-063349 A
[Patent Literature 4] WO 2009/028709 A1
[Patent Literature 5] Japanese Patent Application Publication No. 2009-092480 A
[Patent Literature 6] Japanese Patent Application Publication No. 2009-258090 A

SUMMARY OF THE INVENTION

According to the above simple inspection method, it is possible to detect defective portions in the pillar-shaped honeycomb filter and acquire the distribution of the defective portions. However, even if the defective portions are detected, it is not clear whether the pillar-shaped honeycomb filter that has been inspected satisfies the required PN collection efficiency. Depending on conditions and the number of defective portions, the required specifications may be satisfied. It is not preferable to regard it as a defective product due to the presence of a slight defect despite satisfying the required specifications because it leads to a decrease in a product yield.

In view of the above circumstances, an object according to one embodiment of the present invention is to provide an inspection method for a pillar-shaped honeycomb filter, which can determine the quality of the filter as a whole.

As a result of intensive studies to solve the above problems, the present inventors have found that a simple inspection that can determine the quality of the filter as a whole can be performed by carrying out the inspection of the filter based on the total amount of fine particles leaking from the outlet end face of the filter, rather than carrying out the inspection based on the presence or absence of the defective portion and the distribution. The present invention has been completed based on the findings, and is illustrated below.

[1]

An inspection method for a pillar-shaped honeycomb filter having a honeycomb-shaped first end face and a honeycomb-shaped second end face, the method comprising steps of:

arranging the filter such that the first end face is placed on a lower side and the second end face is placed on an upper side;

allowing gas containing fine particles to flow into the first end face;

measuring information concerning a concentration of fine particles in the gas before flowing into the first end face;

irradiating a vicinity directly above the second end face with sheet-like light parallel to the second end face so as to cover the entire second end face;

imaging the entire second end face covered with the sheet-like light using a camera disposed above the sheet-like light while the gas that has flowed into the first end face flows out of the second end face through the filter, and generating an image of the entire second end face covered with the sheet-like light;

selecting an inspection area of the second end face from the image of the entire second end face covered with the sheet-like light, and measuring information concerning a sum of luminance of all pixels in the inspection area; and determining quality of the filter based on at least the information concerning the concentration of the fine particles in the gas before the gas flows into the first end face and the information concerning the sum of luminance.

[2]

The method according to [1], wherein the information concerning the concentration of the fine particles in the gas is a light absorption coefficient or a light transmittance of the gas.

[3]

The method according to [1] or [2], wherein the information concerning the sum of luminance is a sum of luminance of all pixels representing the second end face covered with the sheet-like light, or an average luminance obtained by dividing the sum of luminance by the number of pixels in the inspection area.

[4]

The method according to any one of [1] to [3], wherein the inspection area covers an area of from 90% to 100% of the entire second end face.

[5]

The method according to any one of [1] to [4], wherein a light source of the sheet-like light is a laser or a slit light LED.

[6]

The method according to any one of [1] to [5], wherein the step of determining the quality of the filter comprises plotting measured values obtained in the step of measuring the information concerning the concentration of the fine particles and the step of measuring the information concerning the sum of luminance on a two-dimensional coordinate in which one coordinate axis shows the information concerning the concentration of the fine particles in the gas, and another coordinate axis shows the information concerning the sum of luminance; and determining the quality of the filter based on a positional relationship between a coordinate position of a plotted point and a predetermined determination line drawn on the two-dimensional coordinate.

[7]

The method according to any one of [1] to [6], wherein a time lag between the step of measuring the information concerning the concentration of the fine particles, and the step of imaging the entire second end face covered with the sheet-like light using the camera is within 10 seconds.

[8]

The method according to any one of [1] to [7], wherein the filter is a pillar-shaped honeycomb filter to which a specific product number should be given; and wherein the step of determining the quality of the filter comprises:

based on a correlation among the information concerning the concentration of the fine particles, the information concerning the sum of luminance, and information concerning collection performance on particulate matters in an exhaust gas under predetermined conditions, which has preliminarily been obtained for a pillar-shaped honeycomb filter to which a same product number as the specific product number has been given, estimating the collection performance of the filter on the particulate matters in the exhaust gas under the predetermined conditions from measured values obtained in the step of measuring the information concerning the concentration of the fine particles and the step of measuring the information concerning the sum of luminance.

[9]

The method according to [8], wherein the correlation is plotted in association with the information concerning the concentration of the fine particles, on a two-dimensional coordinate in which one coordinate axis shows the information concerning the collection performance on particulate matters in the exhaust gas under the predetermined conditions, and another coordinate axis shows the information concerning the sum of luminance, for the pillar-shaped honeycomb filter to which the same product number has been given.

According to the inspection method according to an embodiment of the present invention, it is possible to easily obtain a determination result regarding the quality of the filter as a whole, particularly the PN collection efficiency.

DETAILED DESCRIPTION OF THE INVENTION

Embodiments according to the present invention will now be described in detail with reference to the drawings. It should be understood that the present invention is not intended to be limited to the following embodiments, and any change, improvement or the like of the design may be appropriately added on the basis of ordinary knowledge of those skilled in the art without departing from the spirit of the present invention.

<1. Pillar-Shaped Honeycomb Filter>

An embodiment of a wall flow type pillar-shaped honeycomb structure (a pillar-shaped honeycomb filter) to be inspected in an inspection method according to the present invention will be described. The pillar-shaped honeycomb filter can be used as a DPF (Diesel Particulate Filter) and a GPF (Gasoline Particulate Filter) for collecting soot installed in an exhaust gas line from a combustion device, typically an engine mounted on a vehicle. The pillar-shaped honeycomb filter according to the present invention can be arranged in an exhaust pipe, for example.

Figure 1:
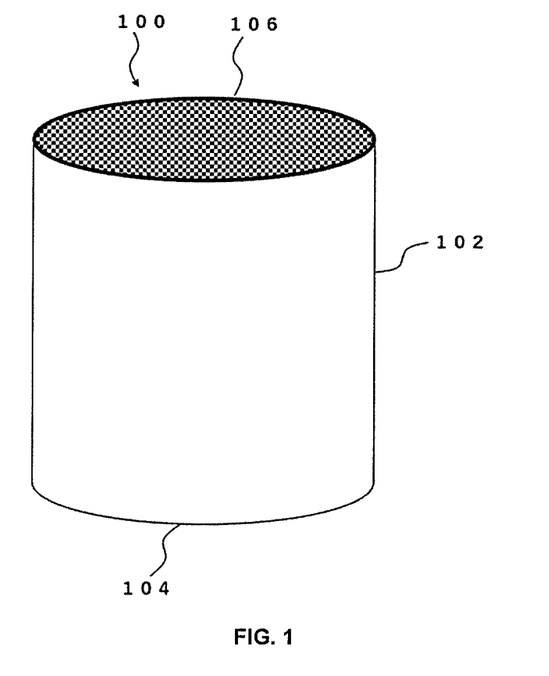
FIG. 1 is a perspective view schematically showing an example of a pillar-shaped honeycomb filter.
Figure 2:
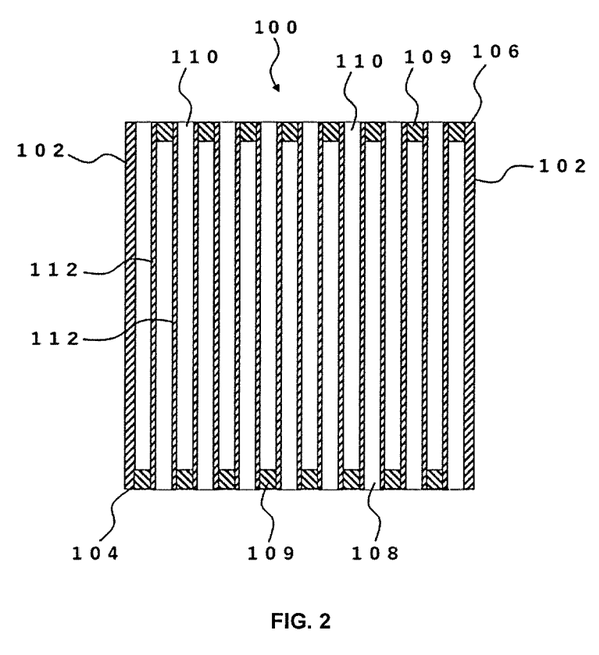
FIG. 2 is a schematic cross-sectional view of an example of a pillar-shaped filter as observed from a direction orthogonal to a cell extending direction.

FIGS. 1 and 2 illustrate a schematic perspective view and a cross-sectional view of a pillar-shaped honeycomb filter (100), respectively. The pillar-shaped honeycomb filter (100) includes: an outer peripheral side wall (102); a plurality of first cells (108) arranged on an inner peripheral side of the outer peripheral side wall (102), each of the first cells (108) extending from a first end face (104) to a second end face (106), the first end surface (104) being opened and the second end face (106) having plugged portions (109); and a plurality of second cells (110) arranged on the inner peripheral side of the outer peripheral side wall (102), each of the second cells (110) extending from the first end face (104) to the second end face (106), the first end face (104) having plugged portions (109), and the second end face (106) being opened. In the pillar-shaped honeycomb filter (100), each of the first cells (108) and each of the second cells (110) are alternately arranged adjacent to each other interposing a partition wall (112) therebetween, whereby each of the first end face (104) and the second end face (106) presents a honeycomb shape.

When an exhaust gas containing particulate matters such as soot is fed to the first end face (104) on an upstream side of the pillar-shaped honeycomb filter (100), the exhaust gas is introduced into the first cells (108) and proceeds in the first cells (108) toward the downstream. Since the first cells (108) have the plugged portion on the second end face (106)

on the downstream side, the exhaust gas passes through the porous partition walls (112) partitioning the first cell (108) from the second cell (110), and flows into the second cells (110). Since the particulate matters cannot pass through the partition walls (112), they are collected and deposited in the first cells (108). After the particulate matters are removed, the clean exhaust gas that has flowed into the second cells (110) proceeds toward the downstream in the second cells (110) and flows out of the second end face (106) on the downstream side.

Examples of materials for forming the pillar-shaped honeycomb filter according to the present embodiment include, but are not limited to, porous ceramics. The ceramics include cordierite, mullite, zirconium phosphate, aluminum titanate, silicon carbide, silicon-silicon carbide composite (e.g., Si-bonded SiC), cordierite-silicon carbide composite, zirconia, spinel, indialite, sapphirine, corundum, titania, silicon nitride and the like. These ceramics may be contained in one kind alone or may be contained in two or more kinds at the same time.

A catalyst that assists PM combustion may be supported on surfaces of the partition walls or inside the partition walls. The catalyst may appropriately contain a precious metal (Pt, Pd, Rh, or the like), an alkali metal (Li, Na, K, Cs, or the like), an alkaline earth metal (Ca, Ba, Sr, or like), a rare earth (Ce, Sm, Gd, Nd, Y, Zr, Ca, La, Pr, or the like), a transition metal (Mn, Fe, Co, Ni, Cu, Zn, Sc, Ti, V, Cr, or the like), or the like.

Examples of shape of the end faces of the pillar-shaped honeycomb structure include, but not limited to, round shapes such as a circular shape, an oval shape, a race track shape and an elliptical shape, and polygonal shapes such as a triangular shape and a quadrangular shape. The illustrated pillar-shaped honeycomb filter (100) has circular end faces and is cylindrical as a whole.

Examples of shape of the cells in the cross-section perpendicular to the flow path direction of the cell include, but not limited to, preferably a quadrangle, a hexagon, an octagon, or a combination thereof. Among them, square and hexagon are preferred. Such a cell shape results in a decreased pressure loss when the fluid is passed through the pillar-shaped honeycomb structure body.

A cell density (the number of cells per unit cross-sectional area) is not particularly limited, and it may be, for example, from 6 to 2000 cells/square inch (from 0.9 to 311 cells/cm$^2$), and more preferably from 50 to 1000 cells/square inch (from 7.8 to 155 cells/cm$^2$), and even more preferably from 100 to 400 cells/square inch (from 15.5 to 62.0 cells/cm$^2$).

The pillar-shaped honeycomb filter can also be provided as an integrally formed product. The pillar-shaped honeycomb filter can also be provided as a segment joined body by joining and integrating outer peripheral side surfaces of segments of a plurality of pillar-shaped honeycomb filters, each having the outer peripheral side wall. By providing the pillar-shaped honeycomb filter as the segment joined body, thermal shock resistance can be increased.

<2. Method for Producing Pillar-Shaped Honeycomb Filter>

The method for producing the pillar-shaped honeycomb filter is described below as an example. First, a raw material composition containing a ceramic raw material, a dispersion medium, a pore former and a binder is kneaded to form a green body. The green body is then extruded to form a desired pillar-shaped honeycomb formed body. The raw material composition may optionally contain any additive such as a dispersant. In extrusion molding, a die having a desired overall shape, cell shape, partition wall thickness, cell density and the like can be used.

After the pillar-shaped honeycomb formed body is dried, plugged portions are formed on both end faces of the pillar-shaped honeycomb formed body, and the plugged portions are then dried to obtain a pillar-shaped honeycomb formed body having the plugged portions. After that, the pillar-shaped honeycomb formed body is subjected to degreasing and firing to produce a pillar-shaped honeycomb filter.

The ceramic raw material that can be used includes a raw material capable of forming the above ceramics after firing. The ceramic raw material can be provided, for example, in the form of powder. Examples of the ceramic raw material include raw materials for obtaining ceramics such as cordierite, mullite, zircon, aluminum titanate, silicon carbide, silicon nitride, zirconia, spinel, indialite, sapphirine, corundum, and titania. Specific examples include, but not limited to, silica, talc, alumina, kaolin, serpentine, pyrophyllite, brucite, boehmite, mullite, magnesite, and aluminum hydroxide. The ceramic raw material may be used alone or in combination of two or more types.

For filter applications such as DPFs and GPFs, cordierite can be preferably used as the ceramic. In this case, a cordierite-forming raw material can be used as the ceramic raw material. The cordierite-forming raw material is a raw material that will form cordierite by firing. The cordierite-forming raw material is preferably composed of a chemical composition having 30 to 45% by mass of alumina ($Al_2O_3$) (including an amount of aluminum hydroxide converted to alumina), 11 to 17% by mass of magnesia (MgO), and 42 to 57% by mass of silica ($SiO_2$).

Examples of the dispersion medium include water or a mixed solvent of water and an organic solvent such as alcohol. Particularly, water can be suitably used.

The pore former is not particularly limited as long as it forms pores after firing. Examples include wheat flour, starch, foaming resins, water-absorbing resins, porous silica, carbon (e.g., graphite), ceramic balloons, polyethylene, polystyrene, polypropylene, nylon, polyester, acrylics, phenols and the like. The pore former may be used alone or in combination with two or more types. From the viewpoint of increasing the porosity of the fired body, the content of the pore former is preferably 0.5 parts by mass or more, and more preferably 2 parts by mass or more, and even more preferably 3 parts by mass or more, based on 100 parts by mass of the ceramic raw material. From the viewpoint of ensuring the strength of the fired body, the content of the pore former is preferably 10 parts by mass or less, and more preferably 7 parts by mass or less, and even more preferably 4 parts by mass or less, based on 100 parts by mass of the ceramic raw material.

Examples of the binder include organic binders such as methyl cellulose, hydroxypropyl methyl cellulose, hydroxyethyl cellulose, carboxymethyl cellulose, and polyvinyl alcohol. In particular, it is preferable to use methyl cellulose in combination with hydroxypropyl methyl cellulose. Further, the content of the binder is preferably 4 parts by mass or more, and more preferably 5 parts by mass or more, and 6 parts by mass or more, based on 100 parts by mass of the ceramic raw material, in terms of increasing the strength of the honeycomb formed body. The content of the binder is preferably 9 parts by mass or less, and more preferably 8 parts by mass or less, and even more preferably 7 parts by mass or less, based on 100 parts by mass of the ceramic raw material, in terms of suppressing cracking due to abnormal heat generation in the firing step. The binder may be used alone or in combination with two or more types.

The dispersant that can be used includes ethylene glycol, dextrin, fatty acid soaps, polyether polyol and the like. The dispersant may be used alone or in combination with two or more types. The content of the dispersant is preferably from 0 to 2 parts by mass based on 100 parts by mass of the ceramic raw material.

The method for plugging the end faces of the pillar-shaped honeycomb formed body is not particularly limited, and a well-known method can be employed. Materials of the plugged portions are not particularly limited. Ceramic is preferable in terms of strength and heat resistance. The ceramic is preferably a ceramic material containing at least one selected from the group consisting of cordierite, mullite, zircon, aluminum titanate, silicon carbide, silicon nitride, zirconia, spinel, indialite, sapphirine, corundum, and titania. Even more preferably, the plugged portions have the same material composition as a main body portion of the honeycomb formed body because it can provide the same expansion coefficient during firing, leading to improved durability.

After drying the honeycomb formed body, degreasing and firing can be carried out to produce the pillar-shaped honeycomb filter. For conditions of the drying step, the degreasing step, and the firing step, known conditions may be used according to the material composition of the honeycomb formed body, and no particular explanation is required. However, specific examples of the conditions are given below.

In the drying step, conventionally known drying methods such as hot gas drying, microwave drying, dielectric drying, drying under reduced pressure, vacuum drying, and freeze drying can be used. Among them, a drying method that combines the hot gas drying with microwave drying or dielectric drying is preferable in that the entire formed product can be quickly and uniformly dried. When forming the plugged portions, it is preferable to form the plugged portions on both end faces of the dried honeycomb formed body and then dry the plugged portions.

Next, the degreasing step will be described. A combustion temperature of the binder is about 200° C., and a combustion temperature of the pore former is about from 300 to 1000° C. Therefore, the degreasing step may be carried out by heating the honeycomb formed body at a temperature in a range of from about 200 to 1000° C. A heating time is not particularly limited but it is generally about from 10 to 100 hours. The honeycomb formed body after the degreasing step is referred to as a calcined body.

Depending on the material composition of the honeycomb formed body, the firing step can be carried out, for example, by heating the calcined body to 1350 to 1600° C. and holding it for 3 to 10 hours.

The fired honeycomb formed body may be used as it is as a filter, or porous films for collecting PMs may be additionally formed on the partition walls in order to improve the PN collection efficiency. Any known method can be employed as the method for forming the porous films. In an embodiment, the porous film can contain, in total, 50% by mass or more of one or more selected from silicon carbide, cordierite, alumina, silica, mullite and aluminum titanate.

<3. Inspection Method for Pillar-Shaped Honeycomb Filter)

An embodiment of an inspection method for the pillar-shaped honeycomb filter as described above will be described in detail below.

According an embodiment of the present invention, provided is:

An inspection method for a pillar-shaped honeycomb filter having a honeycomb-shaped first end face and a honeycomb-shaped second end face, the method including steps of:

arranging the filter such that the first end face is placed on a lower side and the second end face is placed on an upper side;

allowing gas containing fine particles to flow into the first end face;

measuring information concerning a concentration of fine particles in the gas before flowing into the first end face;

irradiating a vicinity directly above the second end face with sheet-like light parallel to the second end face so as to cover the entire second end face;

imaging the entire second end face covered with the sheet-like light using a camera disposed above the sheet-like light while the gas that has flowed into the first end face flows out of the second end face through the filter, and generating an image of the entire second end face covered with the sheet-like light;

selecting an inspection area of the second end face from the image of the entire second end face covered with the sheet-like light, and measuring information concerning the sum of luminance of all pixels in the inspection area; and determining quality of the filter based on at least the information concerning the concentration of the fine particles in the gas before the gas flows into the first end face and the information concerning the sum of luminance.

(1. Step of Arranging Filter)

In an embodiment of the inspection method for the pillar-shaped honeycomb filter according to the present invention, the step of arranging the filter such that the first end face (the end face on the inlet side) is placed on a lower side and the second end face (the end face on the outlet side) is placed on an upper side is carried out. Typically, the filter is arranged such that a cell extending direction is parallel to a vertical direction. The arrangement of the pillar-shaped honeycomb filter in this way leads to ease of accurate measurement of the information concerning the sum of luminance based on the concentration of the fine particles in the gas flowing out of the second end face in the steps as described later.

(2. Step of Allowing Gas Containing Fine Particles to Flow into Filter)

In an embodiment of the inspection method for the pillar-shaped honeycomb filter according to the present invention, a step of allowing a gas containing fine particles to flow into the first end face is carried out. The step is generally carried out after arranging the pillar-shaped honeycomb filter at a predetermined position. For the gas containing the fine particles, an exhaust gas from an actual engine operated may be used, although no particularly limited thereto. However, in terms of easy reproduction of inspection conditions and convenience, the gas containing the fine particles is preferably obtained by: a method of burning fragrances such as incense sticks in air; a method of spraying glycols and/or water in air to generate their fine particles; a method of generating fine particles of water by using solid carbon dioxide, liquid nitrogen, a sprayer, an ultrasonic humidifier, or the like; a method of using a commercially available standard particle generator; and a method of generating dusts by subjecting fine particle powder such as calcium carbonate to a vibrator or a blower. Among them, the gas containing the fine particles can be preferably obtained by the method of burning fragrances such as the incense sticks in air, in terms of easy availability, ease of handling, and cost.

Example of the gas serving as a carrier of the fine particles include, but not particularly limited to, air, nitrogen, helium, hydrogen, argon, and the like. The air is particularly preferable from the viewpoint of cost and safety.

It is preferable that a particle size distribution of the fine particles in the gas containing the fine particles be close to the particle size distribution of the fine particles contained in the actual exhaust gas because it improves the inspection accuracy. For example, a median diameter (D50) based on the number of fine particles contained in the automobile exhaust gas is from 50 to 100 nm in a number-based cumulative particle size distribution obtained by an electrostatic particle classifier and an agglomerated particle counter, and the like. Therefore, it is ideal that the D50 of the fine particles in the gas containing the fine particles used for the inspection be also in this range. However, even if fine particles have a particle size distribution different from the particle size distribution of the fine particles contained in the actual exhaust gas, fine particles up to about 700 nm can be used because of the same collection mechanism.

The collection of the fine particles is mainly classified into the following four types:
(1) diffusion (collected by movement different from the flow due to the Brownian motion of particles);
(2) interruption (collected by physical contact even if particles are carried by the flow);
(3) sedimentation (large particles deviate from the flow due to gravity and cannot pass through); and
(4) inertia (large particles are collected without being carried by the flow even if the flow direction changes).

For particles having a diameter up to about 700 nm, the diffusion and interruption are dominant, so that the use of a gas containing fine particles having a diameter lower than this can allow the actual collection performance to be simulated.

Therefore, in an embodiment, the median diameter (D50) based on the number of fine particles can be from 50 to 500 nm, or from 100 to 300 nm, in the cumulative particle size distribution obtained by an electrostatic particle classifier, an agglomerated particle counter, or the like. When the incense stick is burned, the particle size distribution in this range can be stably obtained, so that highly reproducible evaluation results can be obtained.

(3. Step of Measuring Information Concerning Concentration of Fine Particles)

In an embodiment of the inspection method for the pillar-shaped honeycomb filter according to the present invention, the step of measuring information concerning a concentration of fine particles in a gas before flowing into the first end face is carried out. Even if the quality of the filter is the same, a lower concentration of fine particles in the gas before flowing into the first end face results in a lower concentration of fine particles in the gas flowing out of the second end face, while a higher concentration of fine particles in the gas before flowing into the first end face results in a higher concentration of fine particles in the gas flowing out of the second end face. Therefore, the quality of the filter is determined by considering not only the information concerning the concentration of the fine particles in the gas flowing out of the second end face but also the information concerning the concentration of the fine particles in the gas before flowing into the first end face, so that the inspection accuracy can be improved. The concentration measurement may be carried out before or after arranging the filter.

Examples of the information concerning the concentration of the fine particles include a light absorption coefficient and a light transmittance of the gas, any of which can be used. The light absorption coefficient increases as the concentration of the fine particles increases, and the light transmittance decreases as the concentration of the fine particles increases. It is preferable that the light absorption coefficient or the light transmittance be measured because it can allow the information concerning the concentration of the fine particles to be rapidly obtained. The light absorption coefficient or light transmittance can be measured by using opacimeters. A measurement time of the light absorption coefficient or the light transmittance by the opacimeter is several seconds (e.g., about 3 seconds). Among the opacimeters, a light-transmitting type opacimeter is preferable in terms of measurement accuracy and reproducibility. The light-transmitting type opacimeter measures a rate of attenuation of light intensity due to absorption and scattering when the gas containing the fine particles passes between a light source and a sensor. An equation (1) is established according to a Beer-Lambert's law. Further, an opacity N (%) is obtained by an equation (2), and a light absorption coefficient k ($m^{-1}$) is obtained by an equation (3). An equation (4) represents a light transmittance p (%).

$$I = I_0 e^{-kL} = I_0 \times (1 - N/100) \quad (1)$$

$$N = (1 - I/I_0) \times 100 \quad (2)$$

$$k = -1/L \times \ln(1 - N/100) \quad (3)$$

$$p = I/I_0 \times 100 \quad (4)$$

in which equations, $I_0$ represents light intensity when there is no fine particle in the gas, I represents light intensity when the gas containing the fine particles is flowing, and L represents a measured cell length (m).

Therefore, the information concerning the concentration of the fine particles in the gas also includes the opacity. Further, the information concerning the concentration of the fine particles in the gas is not limited thereto, and it may be the concentration itself of the fine particles, or information measured by a smoke densitometer based on another method.

The concentration of the fine particles in the gas before flowing into the first end face may be set as needed, and is not particularly limited. However, from the viewpoint of improving inspection accuracy, for example, a gas having a light absorption coefficient measured by the opacimeter in the range of from 0.5 to 5 $m^{-1}$ can be preferably used, and a gas having a light absorption coefficient in the range of from 2 to 3 $m^{-1}$ can be more preferably used.

The concentration of the fine particles in the gas before flowing into the first end face is not necessarily constant, and it may be changed over time. Therefore, the step of measuring the information concerning the concentration of the fine particles in the gas before flowing into the first end face may be carried out a plurality of times. In this case, it is also possible to use an average value of values measured a plurality of times.

(4. Step of Irradiation with Light)

In an embodiment of the inspection method for the pillar-shaped honeycomb filter according to the present invention, the step of irradiating a vicinity directly above the second end face with sheet-like light parallel to the second end face so as to cover the entire second end face is carried out. By carrying out this step, accurate information concerning the sum of luminance, which will be described later, can be easily measured over the entire second end face. From the viewpoint of inspection accuracy, a position irradiated with the sheet-like light parallel to the second end face is vicinity directly above the second end face. A specific distance of the vicinity directly above can be appropriately set in a range where the inspection accuracy is not significantly decreased. For example, the distance between the sheet-like light and the second end face can be 10 mm or less, and more preferably 5 mm or less.

The term "parallel" of "sheet-like light parallel to the second end face" is a concept that includes not only parallel in a strict mathematical sense but also substantially parallel. For example, when light having an angle formed by the sheet-like light and the second end face of 3° or less, the sheet-like light can be the "sheet-like light parallel to the second end face". The angle formed by the sheet-like light and the second end face is preferably 2° or less, and more preferably 1° or less.

The light source of the sheet-like light is not particularly limited. For example, a laser (sheet laser light source) or a slit light LED can be used. A wavelength of the emitted light is also not particularly limited as long as it can be imaged with a camera. For example, the wavelength that can be used is about 650 nm (red laser light), about 532 nm (green laser light), about 400 nm (purple laser light), and the like.

An output of the emitted light can be, for example, from 10 to 50 mW, and typically from 20 to 26 mW, although not limited thereto. The laser output in this range provides an advantage that even a slight amount of the particles can be detected. The laser output can be measured with a power meter.

(5. Imaging Step)

In an embodiment of the inspection method for the pillar-shaped honeycomb filter according to the present invention, the step of imaging the entire second end face covered with the sheet-like light using a camera disposed above the sheet-like light while the gas that has flowed into the first end face flows out of the second end face through the filter, and generating an image of the entire second end face covered with the sheet-like light is carried out.

The camera may be either a color camera or a monochrome camera, but it is preferable to use the monochrome camera because only the luminance information needs to be known. Further, the camera preferably has 1 million or more pixels, and more preferably 5 million or more pixels, in terms of improving inspection accuracy. An imaging direction of the camera is not particularly limited as long as the entire second end face covered with the sheet-like light can be imaged from above, but an angle θ formed by the imaging direction of the camera (a normal direction at the center of the lens) and the second end face of the pillar-shaped honeycomb filter is preferably from 10 to 80°, and more preferably from 40 to 50°, in order to make it easier to capture laser scattered light.

The generated image may be displayed on a display device such as an LCD or an organic EL display. Further, a recorder may be connected to the camera, whereby the generated image may be stored and managed as electronic data.

The concentration of the fine particles in the gas before flowing into the first end face is not necessarily constant, and it may change over time. Therefore, if the timing between the step of measuring the information concerning the concentration of the fine particles and the step of imaging the entire second end face covered with the sheet-like light with the camera is significantly shifted, the inspection accuracy may be impaired. Therefore, a time lag between the step of measuring the information concerning the concentration of the fine particles and the step of imaging the entire second end face covered with the sheet-like light with the camera is preferably within 10 seconds. Further, it is preferable that the step of measuring the information concerning the concentration of the fine particles be firstly carried out, and the step of imaging the second end face with the camera be then carried out. However, when the concentration of the fine particles is stable, the step of imaging the second end face with the camera may be firstly carried out, and the step of measuring the information concerning the concentration of the fine particles may be then carried out. Moreover, both steps may be carried out at the same time. Here, the time lag refers to a time difference between a time at the starting of the step of measuring the information concerning the concentration of the fine particles and a time at the starting of the step of imaging the entire second end face covered with the sheet-like light with the camera.

Considering that the concentration of the fine particles in the gas before flowing into the first end face changes over time, the step of imaging the entire second end face covered with the sheet-like light with the camera may be carried out a plurality of times.

(6. Step of Measuring Information Concerning Sum of Luminance)

In an embodiment of the inspection method for the pillar-shaped honeycomb filter according to the present invention, the step of selecting an inspection area of the second end face from the image of the entire second end face covered with the sheet-like light, and measuring information concerning the sum of luminance of all pixels in the inspection area is carried out.

As the sheet-like light hits the fine particles, the light is scattered, and the light scattered in the direction of the camera is detected by the camera as a bright spot, so that the luminance on the image is increased. Therefore, the higher the concentration of the fine particles in the gas flowing out of the pillar-shaped honeycomb filter becomes, the brighter the image becomes as a whole. Therefore, the measurement of the information concerning the sum of luminance of all pixels in the inspection area can allow the quality of the filter, for example, the PN collection efficiency, to be determined. The information concerning the sum of luminance is not limited. For example, it is convenient to use the sum of luminance of all pixels representing the second end face covered with the sheet-like light, or the average luminance obtained by dividing the sum of luminance by the number of pixels in the inspection area.

Further, when the step of imaging the entire second end face covered with the sheet-like light with the camera is carried out multiple times, the information concerning the sum of luminance is measured for each image, and an average value of the values measured multiple times can also be used.

From the viewpoint of determining the quality of the filter as a whole, the quality inspection area of the filter itself preferably includes an area of from 80% to 100% of the entire second end face, and more preferably an area of from 90% to 100% of the entire second end face, and even more preferably an area of from 95% to 100% of the entire second end face.

(7. Step of Determining Quality)

In an embodiment of the inspection method for the pillar-shaped honeycomb filter according to the present invention, the step of determining quality of the filter based on at least the information concerning the concentration of the fine particles in the gas before the gas flows into the first end face and the information concerning the sum of luminance is carried out.

The information concerning the sum of luminance of all pixels in the image of the second end face depends on the information concerning the concentration of the fine particles in the gas before the gas flows into the first end face, and the quality of the pillar-shaped honeycomb filter, for example, PM collection performance. Therefore, it is possible to determine the quality of the pillar-shaped honeycomb filter based on these kinds of information.

An example of a specific quality determining method will be described. For a pillar-shaped honeycomb filter having known collection performance for PMs, the information concerning the concentration of the fine particles in the gas and the information concerning the sum of luminance are measured. The results are then plotted on a two-dimensional coordinate in which one coordinate axis shows the information concerning the concentration of the fine particles in the gas and the other coordinate axis shows the information concerning the sum of luminance, thereby providing a calibration curve for the pillar-shaped honeycomb filter having the known collection performance for PMs. The calibration curves may be prepared for a plurality of pillar-shaped honeycomb filters having different collection performances for PMs. The calibration curve can be used as a determination line.

The inspection method for the pillar-shaped honeycomb filter to be inspected according to the embodiment of the present invention is then carried out to plot the measured values obtained in the step of measuring the information concerning the concentration of the fine particles and the step of measuring the information concerning the sum of luminance on the two-dimensional coordinate. Based on the positional relationship with the determination line, the quality of the entire pillar shaped honeycomb filter to be inspected, in particular the PM collection performance, can be determined. For example, a calibration curve is created for a pillar-shaped honeycomb filter in which the PM collection performance has been confirmed to be located at a boundary between a qualified product and a rejected product, and the calibration curve can be used as the determination line to determine whether or not the inspection is passed. That is, when the coordinate values plotted for the pillar-shaped honeycomb filter to be inspected are above the determination line, it can be determined to be unacceptable, and if it is below the determination line, it can be determined to be acceptable. The determination may be performed by a human or automatically performed using a computer.

An alternative example of the method for determining the quality will be described. The pillar-shaped honeycomb filter as a product is generally given a product number according to specifications. Therefore, if the quality is determined based on data of pillar-shaped honeycomb filters having the same product number as the pillar-shaped honeycomb filter to be inspected, the inspection accuracy can be improved. As used herein, the pillar-shaped honeycomb filters having the same product number refer to pillar-shaped honeycomb filters having the same design specifications before forming porous films on the partitions wall for improving the PN collection efficiency. For example, pillar-shaped honeycomb filters having at least the same design for the entire shape, the material of the partition walls, the cell shape in the cross-section perpendicular to the cell flow path direction, the cell density (the number of cells per unit cross-sectional area), and the thickness of the partition walls (a nominal value based on die specifications) will have the same product number.

Therefore, in an embodiment of the step of determining the quality, the pillar-shaped honeycomb filter to be inspected is a pillar-shaped honeycomb filter to which a specific product number should be given; and the step includes:

based on a correlation among the information concerning the concentration of the fine particles, the information concerning the sum of luminance, and information concerning collection performance on particulate matters in an exhaust gas under predetermined conditions, which has preliminary been obtained for the pillar-shaped honeycomb filter to which a same product number as the specific product number has been given, estimating the collection performance of the filter on the particulate matters in the exhaust gas under the predetermined conditions from the measured values obtained in the step of measuring the information concerning the concentration of the fine particles and the step of measuring the information concerning the sum of luminance.

When the correlation is plotted on the two-dimensional coordinate, it is easy to understand the correlation visually. Therefore, in an embodiment, the correlation is plotted in association with the information concerning the concentration of the fine particles, on a two-dimensional coordinate in which one coordinate axis shows the information concerning the collection performance on particulate matters in the exhaust gas under the predetermined conditions, and another coordinate axis shows the information concerning the sum of luminance, for the pillar-shaped honeycomb filter to which the same product number has been given. It is desirable that the information of the concentration of the fine particles when plotting the information concerning the collection performance on the particulate matters in the exhaust gas and the information concerning the sum of luminance on the two-dimensional coordinate is identical. However, some differences may be acceptable as long as they do not significantly affect the inspection accuracy. For example, if the information concerning the collection performance on the particulate matters in the exhaust gas and the information concerning the sum of luminance can have a correlation with a coefficient of determination of 0.7 or more, and preferably a coefficient of determination of 0.8 or more, the information concerning the concentration of the fine particles may have some differences (a certain range). Illustratively, when the information concerning the concentration of the fine particles is the light absorption coefficient, the difference between the maximum value and the minimum value of the light absorption coefficient can be 1.5 $m^{-1}$ or less, and preferably 1.0 $m^{-1}$ or less.

(8. Arrangement Example of Inspection System)

Figure 3:
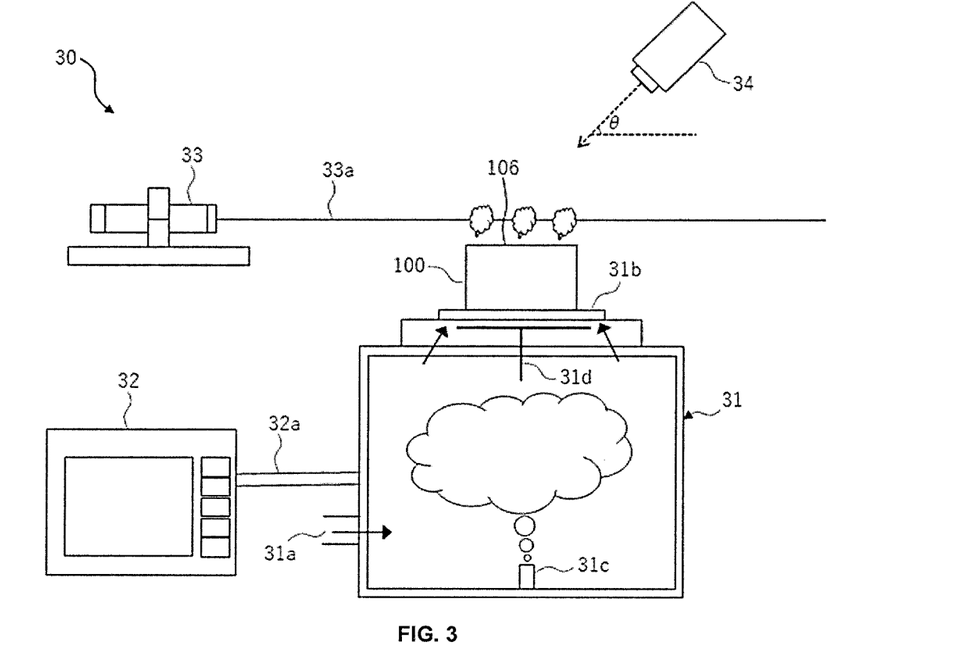
FIG. 3 is a schematic view showing an arrangement example of an inspection system for a pillar-shaped honeycomb filter.
Figure 4:
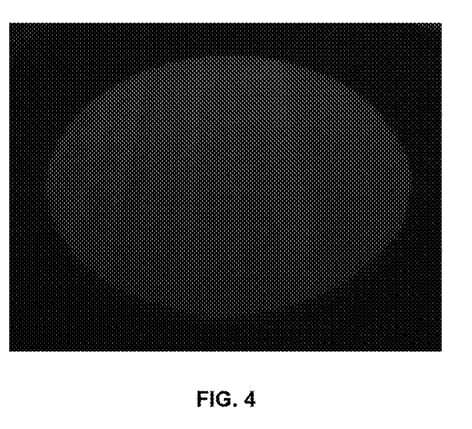
FIG. 4 is an example of an image that captures fine particles visualized by being exposed to sheet-like light.

FIG. 3 schematically shows an arrangement example of an inspection system (30) for carrying out the inspection method according to the present invention. The inspection system (30) includes: a smoke chamber (31); an opacimeter (32); a sheet laser light source (33), and a camera (34). The smoke chamber (31) includes: an air introduction port (31a); a smoke chamber outlet (31b); and a smoke generator (31c). In the illustrated embodiment, the air introduction port (31a) is disposed on a side wall of the smoke chamber (31), the smoke chamber outlet (31b) is disposed on a ceiling wall of the smoke chamber (31), and the smoke generator (31c) is disposed on a floor. On the smoke chamber outlet (31b), a pillar-shaped honeycomb filter (100) to be inspected can be placed.

The smoke chamber outlet (31b) is provided with a damper (31d), which can control the flowing of smoke out of the smoke chamber (31). An annular elastic member (a urethane rubber or the like) is laid on an edge of an opening of the smoke chamber outlet (31b), and the portion of the outer peripheral side wall (102) of the first end face (104) of the pillar-shaped honeycomb filter (100) is placed on the annular elastic member. The placement of the pillar-shaped honeycomb filter (100) on the elastic member can allow a gap between the smoke chamber outlet (31b) and the first end surface (104) to be sealed by the filter's own weight, so that smoke can be prevented from leaking.

The opacimeter (32) has a sampling probe (32a) connected to the smoke chamber (31) such that the information concerning the concentration of the fine particles in the smoke chamber (31) can be measured.

The sheet laser light source (33) is disposed at a position where the vicinity of directly above the second end face (106) of the pillar-shaped honeycomb filter (100) to be placed can be irradiated with sheet laser light (33a) parallel to the second end face (106) so as to cover the entire second end face (106). The sheet laser light source (33) may be configured to be able to adjust its height by using an elevator or the like according to the height of the pillar-shaped honeycomb filter (100).

When the sheet laser light (33a) is emitted from the sheet laser light source (33), the camera (34) is disposed at a position and orientation where the entire second end face (106) covered with the sheet laser light (33a) can be imaged from above the sheet laser light (33a).

As the smoke generator (31c), various means as described above can be used. For example, incense sticks can be used.

An example of a measurement procedure using the inspection system (30) will be described. Smoke is generated from the smoke generator (31c). Once the concentration of the smoke in the smoke chamber (31) is stabilized, the pillar-shaped honeycomb filter to be inspected is placed on the smoke chamber outlet (31b). Irradiation with the sheet laser light (33a) is initiated from the sheet laser light source (33), the damper (31d) at the smoke chamber outlet (31b) is opened, and air is introduced into the smoke chamber (31) through the air introduction port (31a), and the measurement of the information concerning the concentration of the fine particles is started by the opacimeter (32). For example, the air can be compressed air, and the flow rate is preferably controlled by using a flow rate control valve. The order of the placement of the pillar-shaped honeycomb filter (100), the irradiation with the sheet laser light (33a), the opening motion of the damper (31d), the introduction of the air into the smoke chamber (31), and the measurement of the opacimeter (32) is not particularly limited. However, in order to stabilize the concentration of the smoke in the smoke chamber (31), all of those procedures are preferably carried out at substantially the same timing (e.g., within 10 seconds, preferably within 5 seconds). Further, the opacimeter (32) and the camera (34) are preferably operated such that a time lag between the step of measuring the information concerning the concentration of the fine particles and the step of imaging the entire second end face covered with the sheet-like light with the camera is within 10 seconds.

EXAMPLES

Hereinafter, Examples for better understanding the present invention and its advantages will be illustrated, but the present invention is not limited to the Examples.

Test Example 1

<Production of Pillar-Shaped Honeycomb Filter>

To 100 parts by mass of a cordierite-forming raw material, 1.5 parts by mass of a pore former, 60 parts by mass of a dispersion medium, 6 parts by mass of an organic binder, and 1.0 part by mass of a dispersant were added, mixed and kneaded to prepare a green body. As the cordierite-forming raw material, alumina, aluminum hydroxide, kaolin, talc, and silica were used. As the dispersion medium, water was used, and as the pore former, carbon such as graphite, wheat flour, starch, a phenol resin, an acrylic resin such as polymethyl methacrylate, polyethylene, or an organic pore former such as polyethylene terephthalate was used, and as the organic binder, hydroxypropyl methyl cellulose, methyl cellulose, hydroxyethyl cellulose, carboxymethyl cellulose, polyvinyl alcohol and the like were used, and as the dispersant, substances having a surface active effect such as ethylene glycol, dextrin, fatty acid soaps, polyalcohol, potassium laurate soaps and the like were used.

The green body was charged into an extrusion molding machine and extruded through a die having a predetermined shape to obtain a pillar-shaped honeycomb formed body. The obtained honeycomb formed body was subjected to dielectric drying and hot air drying, and both end faces were then cut so as to have predetermined dimensions to obtain a honeycomb dried body.

Specifications of the honeycomb dried body are as follows:
Overall shape: a cylindrical shape having a diameter of 132 mm and a height of 120 mm;
Cell shape in a cross-section perpendicular to the cell flow path direction: square;
Cell density (the number of cells per unit cross-sectional area): 200 cells/inch$^2$; and
Thickness of partition wall: 8 mil (200 µm) (a nominal value based on specifications of the die).

The obtained honeycomb dried body was plugged using cordierite as a material such that the first cells and the second cells were alternately arranged adjacent to each other, and then fired in an air atmosphere at a temperature of from 1410 to 1450° C. for 3 to 10 hours to obtain a pillar-shaped honeycomb filter. The mass of porous film applied to the partition walls of the product to improve the collection efficiency was changed, thereby producing pillar-shaped honeycomb filters having PN collection efficiencies of 57.0%, 84.0%, 90.9% and 92.8%, respectively. Here, the PN collection efficiency is an actually measured value when the PN collection efficiency is measured under the following test conditions. Here, the collection efficiency is calculated by the equation: (number of particles on inlet side−number of particles on outlet side)/number of particles on inlet side× 100(%).

(Test Conditions)

An exhaust gas containing PMs at 150° C. was generated by a burner using light oil as a fuel. The exhaust gas was fed to each pillar-shaped honeycomb filter at a flow rate of 4 Nm$^2$/min for one minute, and the PMs were collected by each pillar-shaped honeycomb filter, and the PN (the number of discharged particles) in the exhaust gas was measured by a PN counter on the inlet side (upstream side in the gas flow direction) and on the outlet side (downstream side in the gas flow direction) of each pillar-shaped honeycomb filter.

Hereinafter, the pillar-shaped honeycomb filter having the collection efficiency of 57.0% is referred to as a "57.0% product", the pillar-shaped honeycomb filter having the collection efficiency of 84.0% is referred to as a "84.0% product", and the pillar-shaped honeycomb filter having the collection efficiency of 90.9% is referred to as a "90.9% product", and the pillar-shaped honeycomb filter having the collection efficiency of 92.8% is referred to as a "92.8% product".

<Implementation of Inspection>

Each pillar-shaped honeycomb filter produced above was inspected using the inspection system having the arrangement as shown in FIG. 3. The inspection conditions were as follows:

opacimeter: opacimeter MEXA-600SW available from HORIBA;

sheet laser light source: GreenLyte-MV-EXCEL from GlobalLaser (green laser having a wavelength of 532 nm and an output of 22 mW±0.5 mW);

air flow rate into the smoke chamber: 50 L/min;

fine particle generator: incense sticks (a concentration of fine particles in the smoke chamber was adjusted by increasing or decreasing the number of incense sticks to be disposed from 2 to 8);

monochrome camera: FC5100 available from by TAKENAKA SYSTEM EQUIPMENT CO., LTD. (the number of pixels of 5,000,000);

distance between the second end face of the pillar-shaped honeycomb filter and the sheet laser light: 4.5 mm; and inspection area: 97% of the total area of the second end face.

The measurement of the light absorption coefficient (the information concerning the concentration of the fine particles) by the opacimeter was carried out once after 27 seconds from the starting of the flowing of the smoke through each pillar-shaped honeycomb filter (a measurement time was about 3 seconds). For the timing where the entire second end face covered with the sheet laser light was imaged with the camera, the entire second end face was imaged once per a second from 21 seconds to 30 seconds after the smoke was started to flow through the pillar-shaped honeycomb filter. The inspection area of the second end face was selected from the image of the entire second end face obtained as a result of imaging, and the sum of luminance of all pixels in the inspection area was measured. For the sum of luminance, an average value of values measured 10 times was used.

Figure 5:
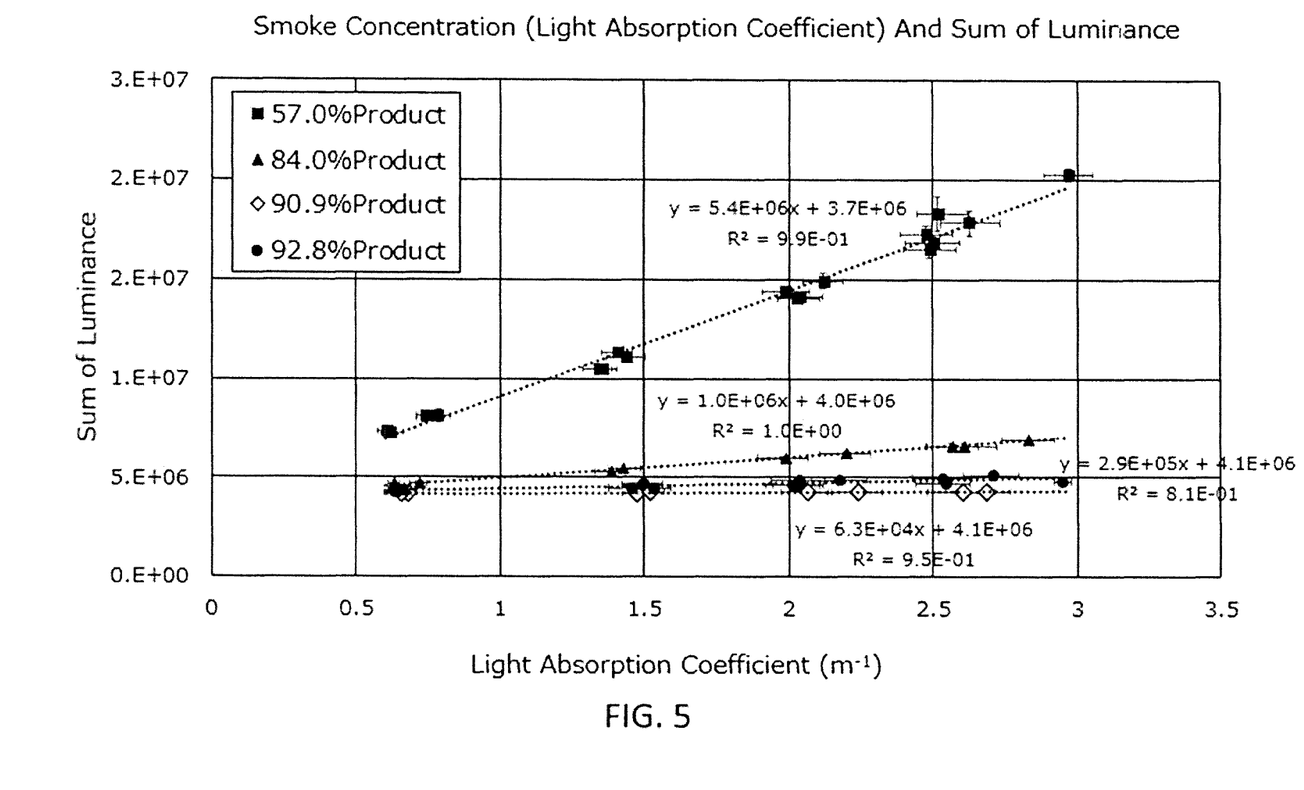
FIG. 5 is a graph in which inspection results are plotted on a two-dimensional coordinate in which an x-axis is a light absorption coefficient and a y-axis is a sum of luminance, for pillar-shaped honeycomb filters having various collection performances produced in Examples.

The above inspection was carried out a plurality of times by changing the concentration of the fine particles in the smoke chamber. The inspection results were plotted on the two-dimensional coordinate in which the x-axis was the light absorption coefficient and the y-axis was the sum of luminance. The obtained graph is shown in FIG. 5. A regression line and a coefficient of determination ($R^2$) obtained by the least square method are also shown in the graph. As can be seen from the graph, there is a high correlation between the light absorption coefficient (the information concerning the concentration of the fine particles) and the sum of luminance. Also, as can be seen from the graph, the regression line varies depending on the PM collection efficiency. From the results, it is understood that when the same inspection is carried out for a pillar-shaped honeycomb filter having an unknown collection efficiency to plot the light absorption coefficient and the sum of luminance on the graph, the PM collection efficiency of the pillar-shaped honeycomb filter, i.e., the quality of the filter as a whole, can be determined.

Test Example 2

Figure 6:
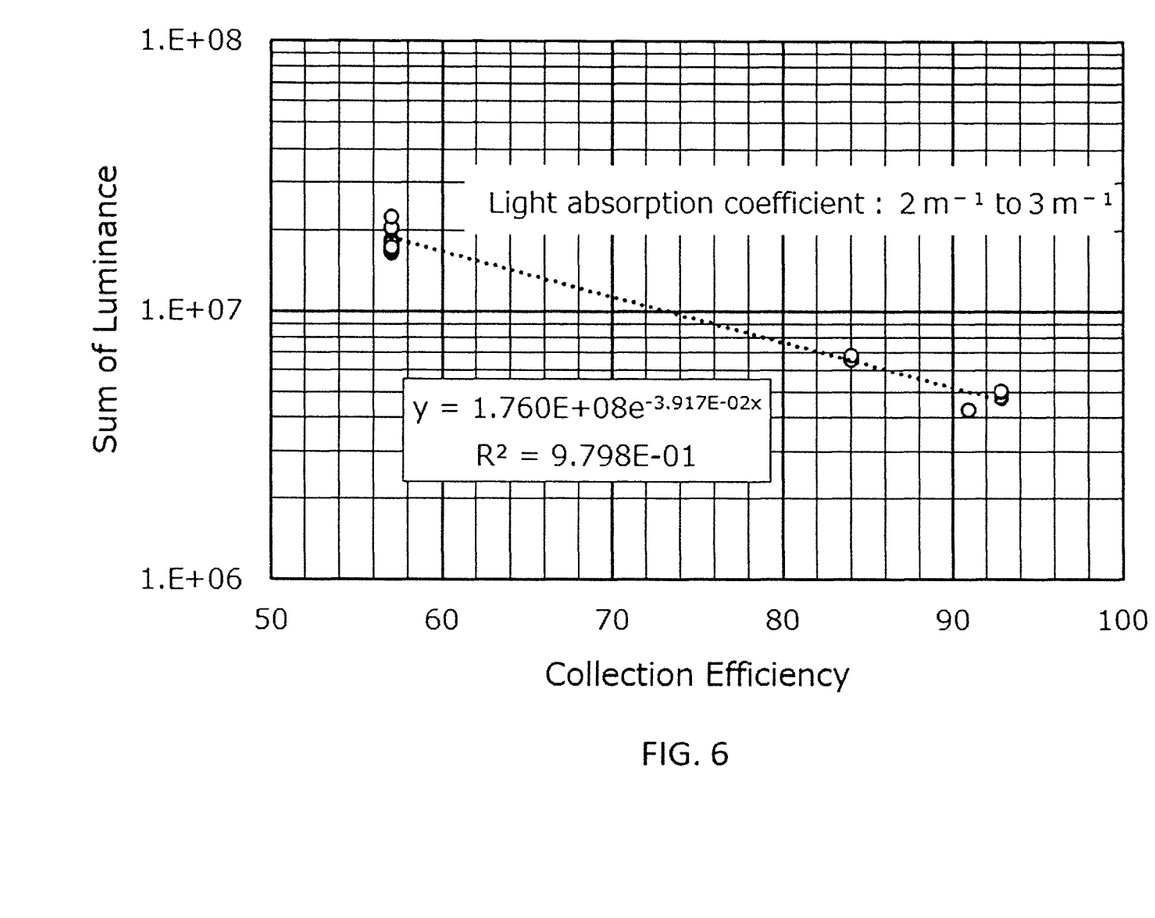
FIG. 6 shows plotted results on a two-dimensional coordinate in which an x-axis is a PN collection efficiency (%) and a y-axis is a sum of luminance when a light absorption coefficient is $2\ m^{-1}$ to $3\ m^{-1}$, for pillar-shaped honeycomb filters having the same product number.

A plurality of "57.0% product", "84.0% product", "90.9% product", and "92.8% product" according to Test Example 1 were produced. These are pillar-shaped honeycomb filters having the same product number because they have the same design specifications before forming the porous films on the partition walls. Each of the obtained pillar-shaped honeycomb filters was inspected in the same procedures as those of Test Example 1 using the inspection system having the arrangement as shown in FIG. 3. Based on the obtained test results, the plotting was carried out on the two-dimensional coordinate in which the x-axis was the PN correction efficiency (%) and the y-axis was the sum of luminance when the light absorption coefficient was 2 $m^{-1}$ to 3 $m^{-1}$. The obtained graph is shown in FIG. 6. The regression line and the coefficient of determination ($R^2$) obtained by the least square method are also shown in the graph. As can be seen from the graph, the collection efficiency can be estimated from the sum of luminance if the filters having the same product number have a light absorption coefficient (the information concerning the concentration of the fine particles) within a certain range.

DESCRIPTION OF REFERENCE NUMERALS 100 pillar-shaped honeycomb structure
102 outer peripheral side wall
104 first end face
106 second end face
108 first cell
109 plugged portion
110 second cell
112 partition wall
30 inspection system
31 smoke chamber
31a air introduction port
31b smoke chamber outlet
31c smoke generator
31d damper
32 opacimeter
32a sampling probe
33 sheet laser light source
33a sheet laser light
34 camera

The invention claimed is:

1. An inspection method for a pillar-shaped honeycomb filter having a honeycomb-shaped first end face and a honeycomb-shaped second end face, the method comprising steps of:

arranging the filter such that the first end face is placed on a lower side and the second end face is placed on an upper side;

allowing gas containing fine particles to flow into the first end face;

measuring information concerning a concentration of fine particles in the gas before flowing into the first end face;

irradiating a vicinity directly above the second end face with sheet-like light parallel to the second end face so as to cover the entire second end face;

imaging the entire second end face covered with the sheet-like light using a camera disposed above the sheet-like light while the gas that has flowed into the first end face flows out of the second end face through the filter, and generating an image of the entire second end face covered with the sheet-like light;

selecting an inspection area of the second end face from the image of the entire second end face covered with the sheet-like light, and measuring information concerning a sum of luminance of all pixels in the inspection area; and determining quality of the filter based on at least the information concerning the concentration of the fine particles in the gas before the gas flows into the first end face and the information concerning the sum of luminance.

2. The method according to claim 1, wherein the information concerning the concentration of the fine particles in the gas is a light absorption coefficient or a light transmittance of the gas.

3. The method according to claim 1, wherein the information concerning the sum of luminance is the sum of luminance of all pixels representing the second end face covered with the sheet-like light, or an average luminance obtained by dividing the sum of luminance by the number of pixels in the inspection area.

4. The method according to claim 1, wherein the inspection area covers an area of from 90% to 100% of the entire second end face.

5. The method according to claim 1, wherein a light source of the sheet-like light is a laser or a slit light LED.

6. The method according to claim 1, wherein the step of determining the quality of the filter comprises plotting measured values obtained in the step of measuring the information concerning the concentration of the fine particles and the step of measuring the information concerning the sum of luminance on a two-dimensional coordinate in which one coordinate axis shows the information concerning the concentration of the fine particles in the gas, and another coordinate axis shows the information concerning the sum of luminance; and determining the quality of the filter based on a positional relationship between a coordinate position of a plotted point and a predetermined determination line drawn on the two-dimensional coordinate.

7. The method according to claim 1, wherein a time lag between the step of measuring the information concerning the concentration of the fine particles, and the step of imaging the entire second end face covered with the sheet-like light using the camera is within 10 seconds.

8. The method according to claim 1,
wherein the filter is a pillar-shaped honeycomb filter to which a specific product number should be given; and
wherein the step of determining the quality of the filter comprises:
based on a correlation among the information concerning the concentration of the fine particles, the information concerning the sum of luminance, and information concerning collection performance on particulate matters in an exhaust gas under predetermined conditions, which has preliminarily been obtained for a pillar-shaped honeycomb filter to which a same product number as the specific product number has been given,
estimating the collection performance of the filter on the particulate matters in the exhaust gas under the predetermined conditions from measured values obtained in the step of measuring the information concerning the concentration of the fine particles and the step of measuring the information concerning the sum of luminance.

9. The method according to claim 8, wherein the correlation is plotted in association with the information concerning the concentration of the fine particles, on a two-dimensional coordinate in which one coordinate axis shows the information concerning the collection performance on the particulate matters in the exhaust gas under the predetermined conditions, and another coordinate axis shows the information concerning the sum of luminance, for the pillar-shaped honeycomb filter to which the same product number has been given.

* * * * *